(12) United States Patent
Ke et al.

(10) Patent No.: US 7,408,848 B2
(45) Date of Patent: Aug. 5, 2008

(54) OBJECTIVE LENS ACTUATOR

(75) Inventors: Chau-Yuan Ke, Hsinchu (TW);
Chi-Lone Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 534 days.

(21) Appl. No.: 11/022,771

(22) Filed: Dec. 28, 2004

(65) Prior Publication Data
US 2006/0143639 A1    Jun. 29, 2006

(51) Int. Cl.
*G11B 7/00* (2006.01)
(52) U.S. Cl. .................................... 369/44.14
(58) Field of Classification Search ........... 720/681, 720/682, 683
See application file for complete search history.

(56) References Cited
U.S. PATENT DOCUMENTS

| | | | | |
|---|---|---|---|---|
| 4,473,274 A | * | 9/1984 | Yano et al. ................ | 359/824 |
| 4,745,589 A | * | 5/1988 | Nomura .................... | 369/44.16 |
| 5,018,033 A | * | 5/1991 | Miyazaki et al. .......... | 720/676 |
| 5,373,496 A | * | 12/1994 | Tomita et al. ............. | 720/682 |
| 5,663,841 A | * | 9/1997 | Akiba et al. .............. | 359/814 |
| 6,181,670 B1 | * | 1/2001 | Nagasato .................. | 720/681 |
| 2003/0198148 A1 | * | 10/2003 | Choi ....................... | 369/44.16 |
| 2004/0268373 A1 | * | 12/2004 | Song et al. ............... | 720/683 |

OTHER PUBLICATIONS

9th Joint MMM/Intermag Conference, Anaheim, California, Jan. 5-9, 2004.
Chau-Yuan Ke et al.,IEEE Transactions on Magnetics, vol. 40, Issue 4, Jul. 2004 pp. 2071-2073.

* cited by examiner

*Primary Examiner*—Joseph Feild
*Assistant Examiner*—Peter Vincent Agustin
(74) *Attorney, Agent, or Firm*—Birch, Stewart, Kolasch & Birch, LLP

(57) ABSTRACT

An objective lens actuator which mainly using an objective lens holder with a flat form facilitates manufacture and fabrication. Also the objective lens actuator controls the focusing direction, tracking direction and radial tilt direction of the optical pickup head. And, the objective lens actuator not only controls but also drives the optical pickup head.

19 Claims, 6 Drawing Sheets

OBJECTIVE LENS ACTUATOR

FIELD OF THE INVENTION

The invention relates to an objective lens actuator for controlling and driving an optical pickup head.

BACKGROUND OF THE INVENTION

The technique of using a laser beam (such as a semiconductor laser) to read data recorded in a read-only optical recording medium (such as a CD or DVD) is well known in the art. The laser beam is focused on the track on the surface of the optical disc through an objective lens located in an optical pickup head, and a photo detector is then used to transform the return light reflected from the optical disc to regenerated signals so that the data recorded in the optical disc may be retrieved. During the data reading process, a tracking signal, focusing signal and radial tilt signal also have to be retrieved from the return light. The tracking signal and the focusing signal are used to control an actuator to move the objective lens in the optical axis direction (i.e. focusing direction), optical disc radial direction (i.e. tracking direction) and radial tilt direction so that the laser beam can accurately focus on a preset track on the optical disc surface.

While control of the radial tilt direction is not necessary in the reading operation of the read-only optical recording media, it is mandatory when the laser beam is used to write data on the writable optical recording media to control writing accuracy. The known technique at present for this purpose involves using an actuator that contains a plurality of coils on an objective lens bracket (or other elements), or forming a plurality of coils on a printed circuit board attached to an objective lens bracket to control the moving directions of the objective lens. Whatever designs are adopted for the coils, the locations of the coils are the same.

SUMMARY OF THE INVENTION

The primary object of the invention is to provide an objective lens actuator to control the focusing direction, tracking direction and radial tilt direction of the pickup head.

In order to achieve the foregoing object, the objective lens actuator according to the invention includes a ferromagnetic yoke, an objective lens holder, tracking coils, focusing coils, a magnetic element set, a suspension wire set, a damper holder and a printed circuit board. The ferromagnetic yoke has a cap that includes four inner yokes and an opening. The objective lens holder is movably located on the ferromagnetic yoke and has an objective lens holding port, and second openings. The objective holding port holds an objective lens. The second openings are located on the two opposite sides of the objective lens holder each two that correspond to each other and the second openings are allowing four inner yokes to pass through. The tracking coils are located on the other two opposite sides of the objective lens holder. The focusing coils are located on the periphery of the second openings each. The magnetic element set includes horizontal magnetic elements and vertical magnetic elements. The horizontal magnetic elements are located on the ferromagnetic yoke corresponding to the focusing coils to generate a magnetic flux orthogonal to the optical axis of the objective lens. The vertical magnetic elements are located on the ferromagnetic yoke corresponding to the tracking coils to generate a magnetic flux parallel to the optical axis of the objective lens. The suspension wire set is connected to the objective lens holder, tracking coils and focusing coils to hang the objective lens holder and channel current to the tracking coils and focusing coils. The damper holder is located on the ferromagnetic yoke to allow the suspension wire set to pass through. The printed circuit board is located on the damper holder and is coupled with the suspension wire set to provide current to the tracking coils and focusing coils to drive the objective lens holder.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
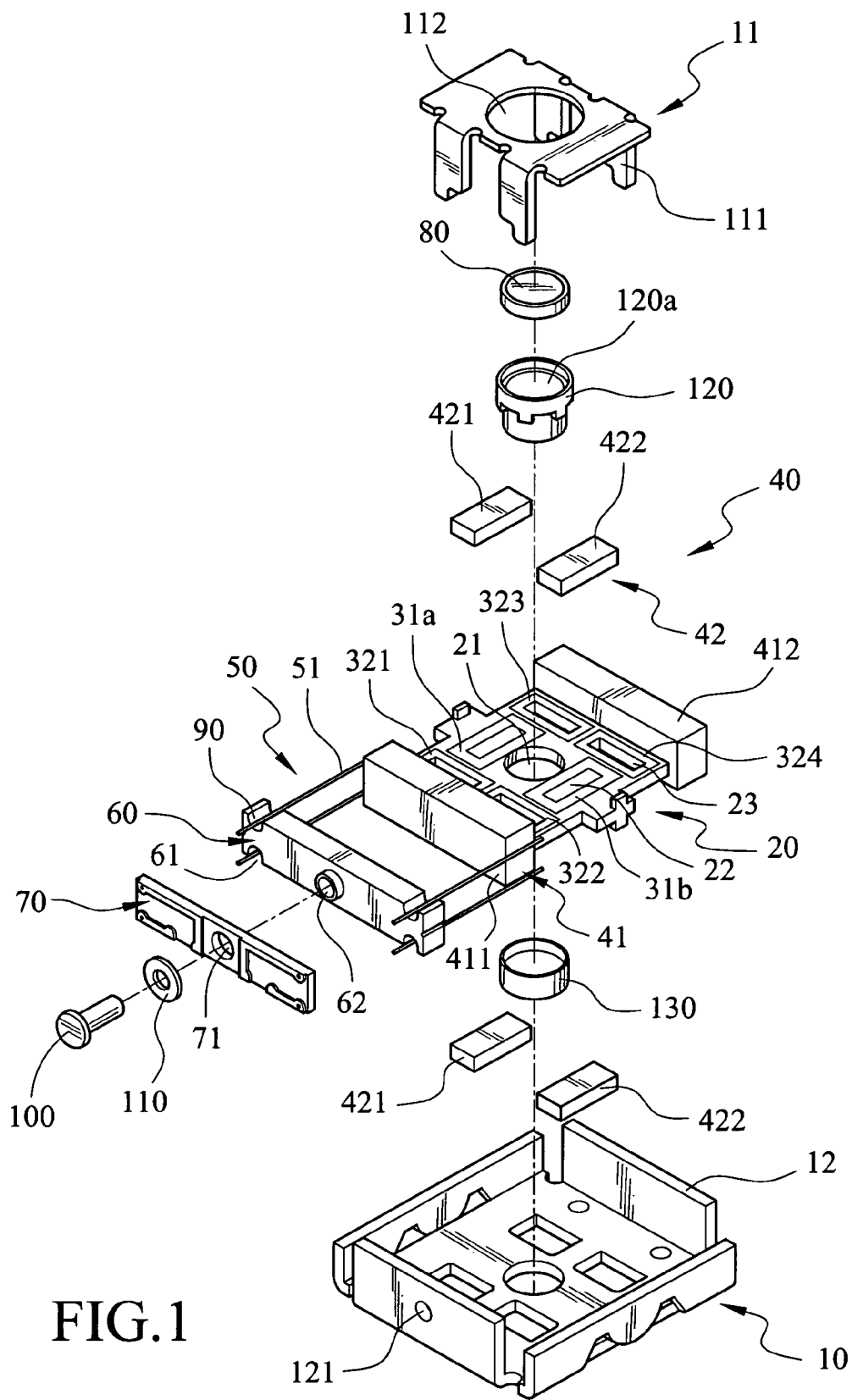
FIG. 1 is an exploded view of the invention.
Figure 2:
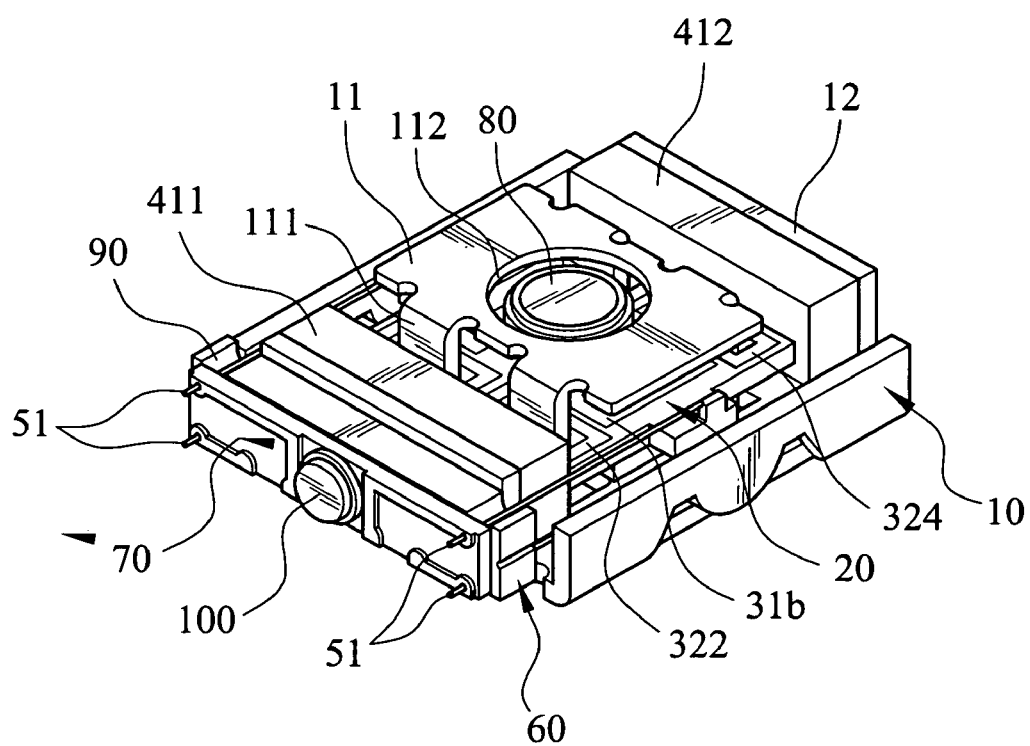
FIG. 2 is a perspective view of the invention.
Figure 3:
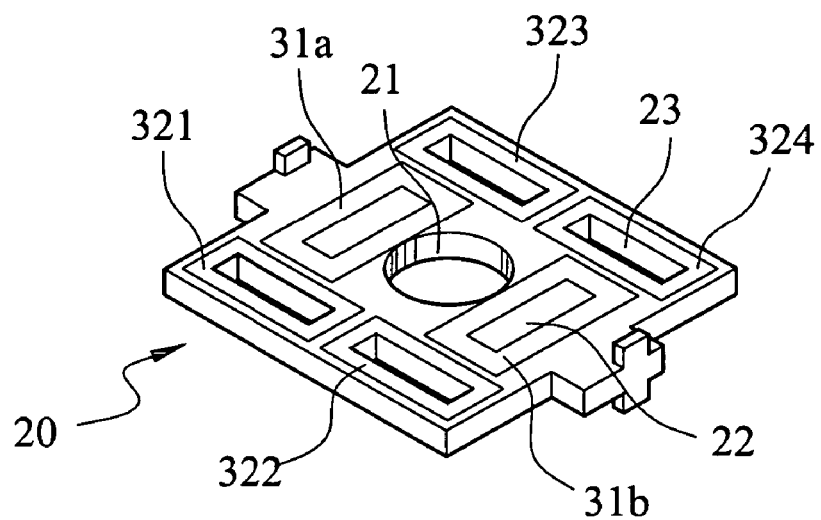
FIG. 3 is a schematic view of the objective lens holder of the invention.

Referring to FIGS. 1, 2 and 3, the objective lens actuator according to the invention includes a ferromagnetic yoke 10, an objective lens holder 20, tracking coils 31a and 31b, focusing coils 321, 322, 323 and 324, a magnetic element set 40, a suspension wire set 50, a damper holder 60 and a printed circuit board 70.

The ferromagnetic yoke 10 has a cap 11 and a plurality of flanges 12 located on lateral sides. The cap 11 includes four inner yokes 111 and an opening 112. The inner yokes 111 are coupled on the objective lens holder 20. The flanges 12 aim to hold the magnetic element set 40, damper holder 60 and printed circuit board 70. One of the flanges 12 has a screw hole 121.

The objective lens holder 20 is movably located on the ferromagnetic yoke 10 and has an objective lens holding port 21, and second openings 23. The objective lens holding port 21 corresponds to the opening 112 to hold an objective lens 80. The second openings 23 are located on the two opposite sides of the objective lens holder 20 each two that correspond to each other and the second openings 23 are to allowing the four inner yokes 111 to pass through. The inner yokes 111 are located on the opposite sides of the second openings 23 corresponding to each other.

The objective lens holder 20 may be a flat board or a printed circuit board. If the objective lens holder 20 is a flat board, the tracking coils 31a and 31b and the focusing coils 321, 322, 323 and 324 are attached thereon. The objective lens 80 may be directly attached to the holding port 21, or be held on the objective lens holder 20 through a coupler 120 and a counter weight 130. The coupler 120 is located on one side of the objective lens holder 20 and includes a holding bore 120a to hold the objective lens 80. The counter weight 130 which is corresponding to the coupler 120 is located on the other side of the objective lens holder 20 to adjust the center of gravity for the objective lens holder 20 and enable the center of gravity for the suspension wire set 50 to correspond to the printed circuit board 70. If the objective lens holder 20 is a printed circuit board, the tracking coils 31a and 31b and the focusing coils 321, 322, 323 and 324 may be coated thereon. The objective lens 80 may be directly attached to the holding port 21, or be held on the objective lens holder 20 through a coupler 120 and a counter weight 130. The coupler 120 is located on one side of the objective lens holder 20, and includes a holding bore 120a to hold the objective lens 80. The counter weight 130 which is corresponding to the coupler 120 is located on the other side of the objective lens holder 20 to adjust the center of gravity for the objective lens holder 20 and enable the center of gravity for the suspension wire set 50 to correspond to the printed circuit board 70.

Moreover, when the objective lens holder 20 is a flat board, the tracking coils 31a and 31b are formed on the other two opposite sides of the objective lens holder 20, while the focusing coils 321, 322, 323 and 324 are formed on the periphery of the second openings 23 each, and the focusing coils 321, 322, 323 and 324 are connected in a serial and parallel fashion.

Figure 4:
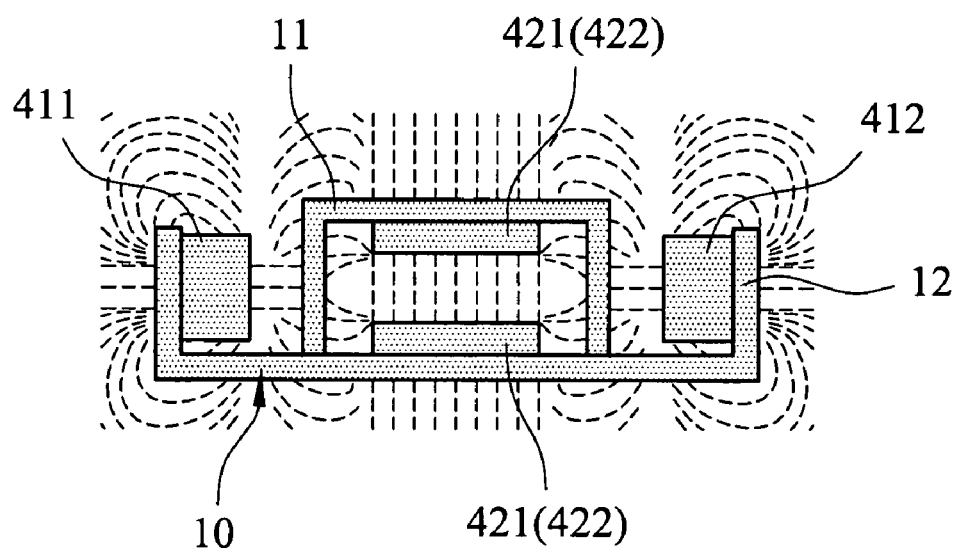
FIG. 4 is a schematic view of magnetic flux directions according to the invention.

The magnetic element set 40 includes a horizontal magnetic element 41 and a vertical magnetic element 42. The horizontal magnetic element 41 is located on the ferromagnetic yoke 10 corresponding to the focusing coils 321, 322, 323 and 324 to generate a magnetic flux orthogonal to the optical axis of the objective lens 80. The vertical magnetic element 42 is located on the ferromagnetic yoke 10 corresponding to the tracking coils 31a and 31b to generate a magnetic flux parallel to the optical axis of the objective lens 80. The magnetic flux direction is shown in FIG. 4.

Figure 5A:
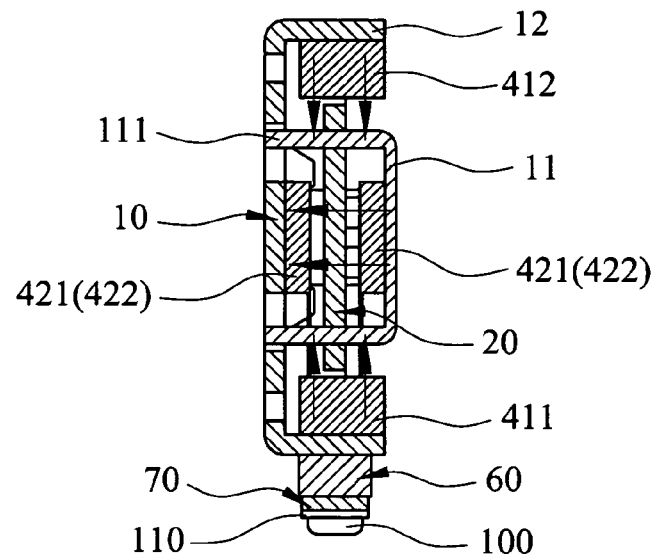
FIGS. 5A and 5B are schematic views of the magnetic element set in one magnetic direction and a cross section taken on line I-I.
Figure 5B:
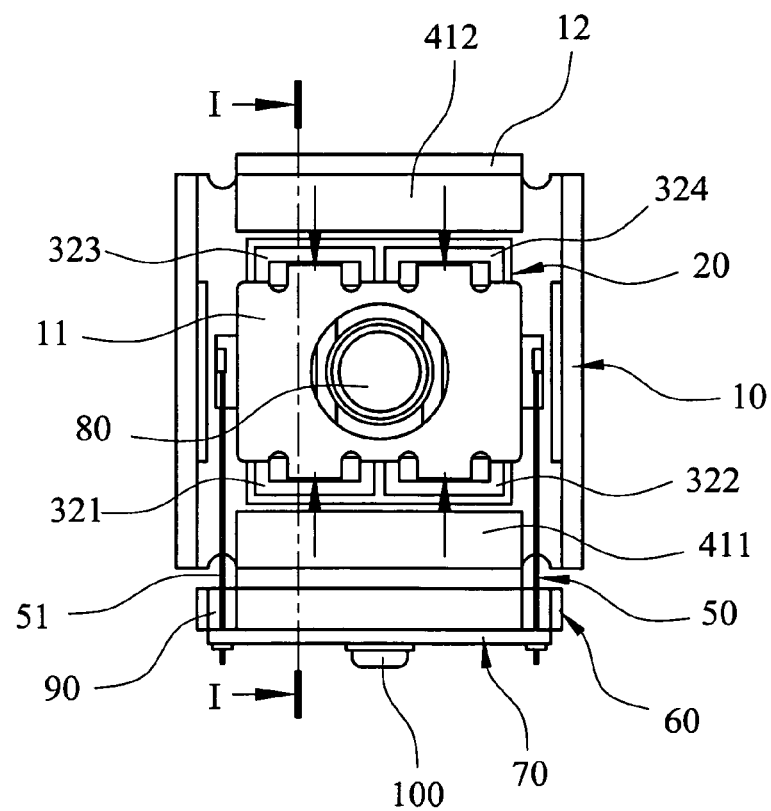
Figure 6A:
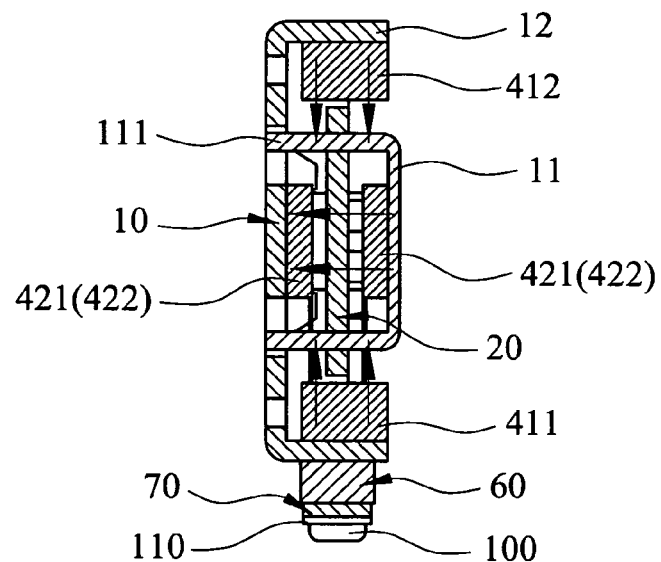
FIGS. 6A and 6B are schematic views of the magnetic element set in another magnetic direction and a cross section taken on line II-II.
Figure 6B:
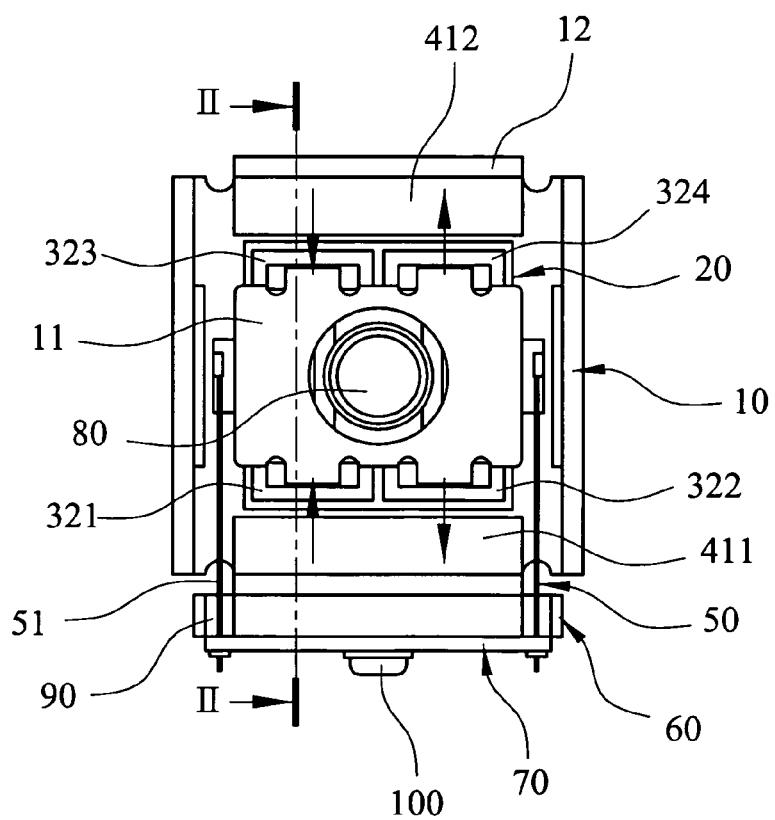

The horizontal magnetic element 41 includes a first horizontal magnetic element 411 and a second horizontal magnetic element 412 that are located respectively on the outer sides of the focusing coils 321, 322, 323 and 324, and the flanges 12 with a magnetic flux direction orthogonal to the horizontal moving direction of the objective lens holder 20. Referring to FIGS. 5A and 5B, the magnetic flux direction from N pole to S pole of the first horizontal magnetic element 411 is in the direction from the flange 12 to the inner yoke 111. The magnetic flux direction from N pole to S pole of the second horizontal magnetic element 412 also is in the direction from the flange 12 to the inner yoke 111. Another design may be adopted as shown in FIGS. 6A and 6B with another magnetic flux direction of the magnetic elements. The magnetic flux direction from N pole to S pole of the first horizontal magnetic element 411 is in the direction from the flange 12 to the inner yoke 111, and from the inner yoke 111 to the flange 12. The magnetic flux direction from N pole to S pole of second horizontal magnetic element 412 is in the direction from the flange 12 to the inner yoke 111 (corresponding to the first horizontal magnetic element 411 that has a magnetic flux direction from N pole to S pole in the direction from the flange 12 to the inner yoke 111), and from the inner yoke 111 to the flange 12 (corresponding to the first horizontal magnetic element 411 that has a magnetic flux direction from N pole to S pole in the direction from the inner yoke 111 to the flange 12).

The vertical magnetic element 42 includes two first vertical magnetic elements 421 and two second vertical magnetic elements 422 corresponding respectively to the two tracking coils 31a and 31b. The two first vertical magnetic elements 421 are located on two opposite sides of one tracking coil 31a and have the same magnetic flux direction. That is, the magnetic flux direction from N pole to S pole of the first vertical magnetic elements 421 is in the direction from the cap 11 to the objective lens holder 20. The two second vertical magnetic elements 422 are located on two opposite sides of the other tracking coil 31b and have the same magnetic flux direction. That is, the magnetic flux direction from N pole to S pole of the second vertical magnetic elements 422 is in the direction from the cap 11 to the objective lens holder 20.

Moreover, the inner yokes 111 are positioned in such a manner so that the magnetic flux generated by the horizontal magnetic element 41 and the vertical magnetic element 42 of the magnetic element set 40 between the inner yokes 111 and the flanges 12 are coincided. Namely, the air gaps have magnetic fields to allow the tracking coils 31a and 31b and the focusing coils 321, 322, 323 and 324 to generate magnetic fluxes.

The suspension wire set 50 includes a suspension wire 51 that has one end connected to the objective lens holder 20, tracking coils 31a and 31b, and focusing coils 321, 322, 323 and 324 to hang the objective lens holder 20 and channel current to the tracking coils 31a and 31b and focusing coils 321, 322, 323 and 324.

The damper holder 60 is located on the ferromagnetic yoke 10 and has a notch 61 to allow the suspension wire set 50 to pass through. The damper holder 60 also has a screw hole 62.

The printed circuit board 70 is located on the damper holder 60 and is coupled with the suspension wire set 50 on the other end of the suspension wire 51 to provide current to the tracking coils 31a and 31b and the focusing coils 321, 322, 323 and 324 to drive the objective lens holder 20. The printed circuit board 70 also has a screw hole 71.

For assembly of the invention, when the objective lens holder 20 is a flat board, the tracking coils 31a and 31b are located on the other two opposite sides of the objective lens holder 20, and the focusing coils 321, 322, 323 and 324 are located on the periphery of the second openings 23 each. If the objective lens holder 20 is a printed circuit board, the tracking coils 31a and 31b and the focusing coils 321, 322, 323 and 324 are coated on the printed circuit board, and no other action is needed. Place the objective lens 80 on the objective lens holding port 21 (or dispose the coupler 120 on one side of the objective lens holder 20, and the counter weight 130 on the other side of the objective lens holder 20, and attach the objective lens 80 to the holding bore 120a). Couple the inner yokes 111 of the cap 11 on the second openings 23 of the objective lens holder 20 with the opening 112 corresponding to the objective lens 80 held in the objective lens holding port 21. Mount the first horizontal magnetic element 411 and the second horizontal magnetic element 412 of the magnetic element set 40 onto two opposite flanges 12, and place the two first vertical magnetic elements 421 on two opposite sides of one tracking coil 31a, namely the ferromagnetic yoke 10 and the cap 11, and place the second vertical magnetic elements 422 on two opposite sides of the other tracking coil 31b, namely the ferromagnetic yoke 10 and the cap 11. Connect one end of the suspension wire 51 of the suspension wire set 50 to the objective lens holder 20, tracking coils 31a and 31b, and focusing coils 321, 322, 323 and 324, and pass the other end of the suspension wire 51 through a damper 90 and connect to the printed circuit board 70. Then a screw 100 runs through a washer 110, the screw hole 121 of the flange 12, the screw hole 62 of the damper holder 60 and the screw hole 71 of the printed circuit board 70 to couple the flange 12, damper holder 60 and printed circuit board 70 together.

After assembling the invention as such, current can flow through the printed circuit board 70 and the suspension wire 51 to the tracking coils 31a and 31b and focusing coils 321, 322, 323 and 324 so that the air gaps between the inner yokes 111 and the flanges 12 have a magnetic field to enable the tracking coils 31a and 31b and focusing coils 321, 322, 323 and 324 to generate magnetic fluxes. While the current flows through the focusing coils 321, 322, 323 and 324, magnetic fluxes are generated to move the objective lens holder 20 vertically. In the event that the magnetic fluxes generated by the focusing coils 321, 322, 323 and 324 are different, the variation of the magnetic fluxes drives the objective lens holder 20 in a tilted movement so that the incident light projected on the data storage medium may be kept as orthogonal as possible to obtain a desired signal.

Figure 7A:
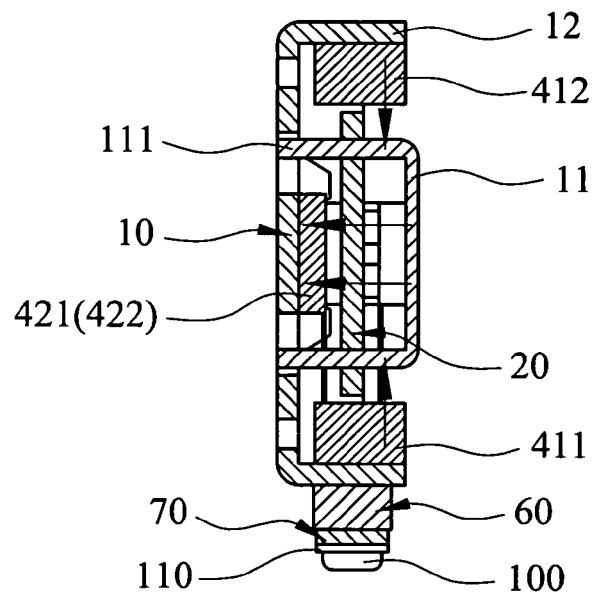
FIGS. 7A and 7B are schematic views of the vertical magnetic element of the magnetic element set and another embodiment thereof.
Figure 7B:
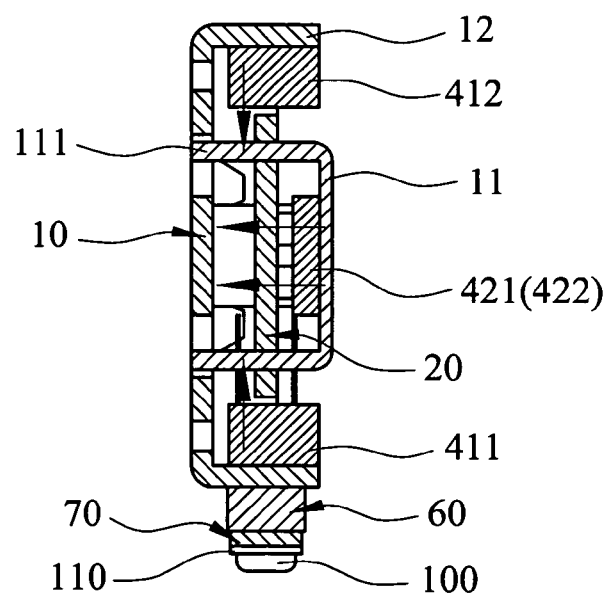

Refer to FIGS. 7A and 7B for another embodiment of the vertical magnetic element of the invention. The magnetic element set 40 may adopt another design. The vertical magnetic element 42 includes a first vertical magnetic element 421 and a second vertical magnetic element 422 located on the same side of the two tracking coils 31a and 31b. Then the two tracking coils 31a and 31b also can generate magnetic fluxes.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An objective lens actuator, comprising:
    a ferromagnetic yoke which includes a cap having four inner yokes and having an opening;
    an objective lens holder which is movably located on the ferromagnetic yoke and which has an objective lens holding port for holding an objective lens, and four second openings which are located on the two opposite sides of the objective lens holder each two that correspond to each other, and which are allowing the four inner yokes to pass through;
    two tracking coils which are located on the other two opposite sides of the objective lens holder and four focusing coils which are located on the periphery of the second openings each;
    a magnetic element set including a horizontal magnetic element and a vertical magnetic element, the horizontal magnetic element being located on the ferromagnetic yoke corresponding to the focusing coils to generate a magnetic flux orthogonal to the optical axis of the objective lens, the vertical magnetic element being located on the ferromagnetic yoke corresponding to the tracking coils to generate a magnetic flux parallel to the optical axis of the objective lens;
    a suspension wire set which is connecting to the objective lens holder, the tracking coils, and the focusing coils to hang the objective lens holder and to channel current to the tracking coils and the focusing coils;
    a damper holder which is located on the ferromagnetic yoke to allow the suspension wire set to pass through; and
    a printed circuit board which is located on the damper holder and which is coupled with the suspension wire set to provide the current to the tracking coils and the focusing coils to drive the objective lens holder.

2. The objective lens actuator of claim 1, wherein the ferromagnetic yoke has a plurality of flanges on lateral sides to hold the magnetic element set, the damper holder and the printed circuit board.

3. The objective lens actuator of claim 2, wherein the flange, the damper holder and the printed circuit board have respectively a screw hole to receive a screw to fasten the damper holder and the printed circuit board to the flange.

4. The objective lens actuator of claim 2, wherein the flanges, the inner yokes and the magnetic element set have air gaps formed therebetween that have magnetic fields to allow the tracking coils and the focusing coils to generate magnetic fluxes.

5. The objective lens actuator of claim 1, wherein the objective lens holder is a flat board to allow the tracking coils and the focusing coils attached thereon.

6. The objective lens actuator of claim 5, wherein the objective lens holder allows the objective lens to be attached to the objective lens holding port.

7. The objective lens actuator of claim 5, further including a coupler located on one side of the objective lens holder and a holding bore to attach the objective lens.

8. The objective lens actuator of claim 7, further including a counter weight corresponding to the coupler located on the other side of the objective lens holder to adjust the center of gravity for the objective lens holder and enable the center of gravity for the suspension wire set to correspond to the printed circuit board.

9. The objective lens actuator of claim 1, wherein the objective lens holder is a printed circuit board which has the tracking coils and the focusing coils coated thereon.

10. The objective lens actuator of claim 9, wherein the objective lens holder allows the objective lens to be attached to the objective lens holding port.

11. The objective lens actuator of claim 9, further including a coupler located on one side of the objective lens holder and a holding bore to attach the objective lens.

12. The objective lens actuator of claim 11, further including a counter weight corresponding to the coupler located on the other side of the objective lens holder to adjust the center of gravity for the objective lens holder and enable the center of gravity for the suspension wire set to correspond to the printed circuit board.

13. The objective lens actuator of claim 1, wherein the focusing coils are coupled in series.

14. The objective lens actuator of claim 1, wherein the focusing coils are coupled in parallel.

15. The objective lens actuator of claim 1, wherein the horizontal magnetic element includes a first horizontal magnetic element and a second horizontal magnetic element located respectively on an outer side of the four focusing coils that have a magnetic flux direction to the horizontal movement direction of the objective lens holder.

16. The objective lens actuator of claim 1, wherein the vertical magnetic element includes a first vertical magnetic element and a second vertical magnetic element located on the same side of the two tracking coils.

17. The objective lens actuator of claim 1, wherein the vertical magnetic element includes two first vertical magnetic elements which are located on two opposite sides of one of the tracking coil and which have same magnetic flux direction, and two second vertical magnetic elements located on two opposite sides of the other of the tracking coil that have the same magnetic flux direction.

18. The objective lens actuator of claim 17, wherein the magnetic flux direction from N pole to S pole of the first vertical in magnetic elements is in the direction from the cap to the objective lens holder.

19. The objective lens actuator of claim 17, wherein the magnetic flux direction from N pole to S pole of the second vertical magnetic elements is in the direction from the cap to the objective lens holder.

* * * * *